United States Patent [19]

Ford et al.

[11] Patent Number: 5,764,279
[45] Date of Patent: Jun. 9, 1998

[54] METHOD AND APPARATUS FOR INSTANTANEOUS IN-BAND DOCUMENT EXCHANGE DURING A VIDEO CONFERENCE

[75] Inventors: Gordon Douglas Ford, Round Rock; Pamela Saegert; Michael Glen Duncan, both of Austin, all of Tex.

[73] Assignee: Siemens Business Communication Systems, Inc., Santa Clara, Calif.

[21] Appl. No.: 905,283

[22] Filed: Aug. 1, 1997

Related U.S. Application Data

[63] Continuation of Ser. No. 769,602, Dec. 18, 1996, which is a continuation of Ser. No. 528,174, Sep. 14, 1995, which is a continuation of Ser. No. 115,966, Sep. 1, 1993, abandoned.

[51] Int. Cl.$^6$ .................................................. H04N 11/00
[52] U.S. Cl. .................... 348/15; 348/17; 379/100.13; 379/93.08; 379/100.17
[58] Field of Search .............. 348/14–17; 370/259–265; 358/400, 468; 379/90.01, 93.01, 93.05, 93.08, 93.14, 93.15, 93.21, 93.26, 100.01, 100.13, 100.17

[56] References Cited

U.S. PATENT DOCUMENTS

| | | | |
|---|---|---|---|
| 4,688,108 | 8/1987 | Cotton et al. | 358/257 |
| 4,884,269 | 11/1989 | Duncanson et al. | 370/94.1 |
| 4,995,071 | 2/1991 | Weber et al. | 379/53 |
| 5,084,770 | 1/1992 | Nakayama | 358/400 |
| 5,323,398 | 6/1994 | Wake et al. | 379/100 |
| 5,373,316 | 12/1994 | Ishinabe et al. | 379/100 |

FOREIGN PATENT DOCUMENTS

| | | | |
|---|---|---|---|
| 0644748 | 1/1993 | Australia | H04N 7/14 |
| 0355838 | 2/1990 | European Pat. Off. | H04N 7/14 |
| 0523617 | 1/1993 | European Pat. Off. | 348/15 |
| 0091327 | 3/1993 | European Pat. Off. | 348/15 |
| 0563594 | 10/1993 | European Pat. Off. | 348/15 |
| 2345872 | 10/1977 | France | 348/15 |
| 3274876 | 12/1991 | Japan | 379/100 |

*Primary Examiner*—Curtis Kuntz
*Assistant Examiner*—Stephen W. Palan

[57] ABSTRACT

A method and apparatus for "piggy backing" a FAX transmission on a video call. A document, in the form of modulated facsimile data, is received from a machine located in proximity of a sending station. The document is demodulated, packetized and a header, indicating that the packet contains facsimile data, is added. The packets are then injected into a digital video stream carrying video conference data bound for the receiving station.

14 Claims, 8 Drawing Sheets

METHOD AND APPARATUS FOR INSTANTANEOUS IN-BAND DOCUMENT EXCHANGE DURING A VIDEO CONFERENCE

CROSS-REFERENCE TO RELATED APPLICATIONS

This is a continuation of Ser. No. 08/769,602 filed Dec. 18, 1996, which is a continuation of Ser. No. 08/528,174 filed Sep. 14, 1995, which is a continuation of Ser. No. 08/115,966 filed Sep. 1, 1993, now abandoned.

BACKGROUND OF THE INVENTION

1. Field of the Invention

This invention relates to video conferencing.

2. Related Art

A popular way of exchanging documents between locations during a video conference meeting is by using a FAX machine at both meeting locations and making a separate call each time a document is to be sent from one location to the other. A diagram of this technique is shown in FIG. 1.

Figure 1:
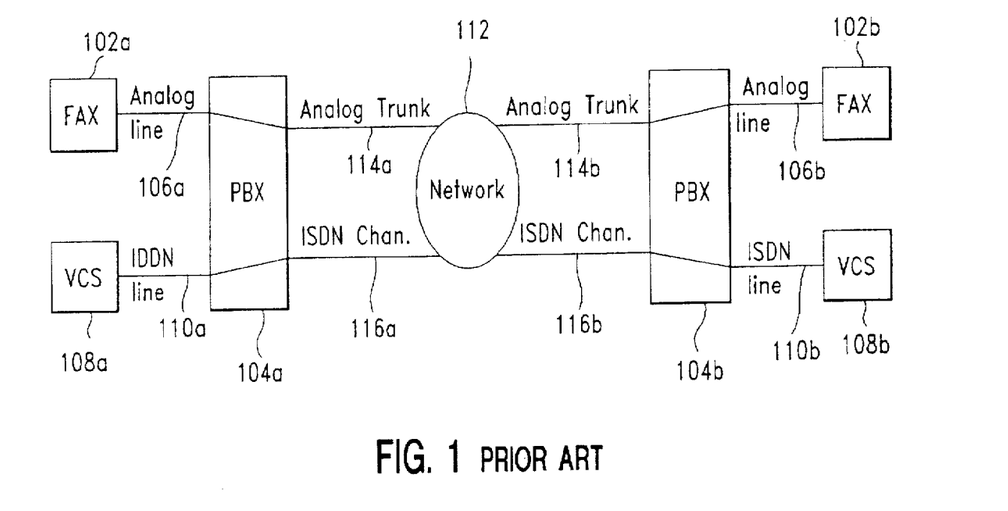
FIG. 1 is a diagram of a prior art system for transmitting facsimile documents during a video conference.

In the system of FIG. 1, a fax machine 102a is connected to a private branch exchange (PBX) 104a, located at a first video conference site, by way of an analog telephone line 106a. A video conferencing system (VCS) 108a is connected to the PBX 104a by way of an ISDN digital telephone line 110a. The PBX 104a is connected to the public telephone network 112 by way of an analog trunk 114a and ISDN channels 116a. A second video conference site is similarly configured with a PBX 104b connected to the public telephone network 112 by way of an analog trunk 114b and ISDN channels 116b, a FAX machine 102b connected to the PBX 104b by way of an analog telephone line 106b and a video conferencing system 108b connected to the PBX 104b by way of an ISDN line 110b.

When a conference participant at the first video conference site wants to send a FAX to a participant at the second video conference site, the sending participant places the document into the FAX machine 102a at the first site, dials the telephone number of the FAX machine 102b at the second site and sends the FAX in a conventional manner.

Even though this is a relatively straightforward procedure, there are several significant drawbacks. For example, some disruption to the conference may occur if one of the participants must prepare the FAX machine to send the FAX. In particular, time can be wasted in determining the appropriate FAX number and then placing the call. This may be particularly true when the FAX call is an international call. Another drawback is that the additional calls to connect with the FAX machine can add to the cost of the video conference.

An alternative method of sharing documents is to place the document within the field of view of a camera ("in camera"). In such systems, a separate document camera can be used to produce a video image of the document to be discussed. This "document camera" method of sharing documents allows the remote end to see, but not handle, the document. The remote user cannot mark on the document and send it back. Also, while the document is being transmitted to the far end, the image of the participants cannot be transmitted to the far end thereby interrupting the conference.

In any event, the result is often that the meeting is less effective than it could have been due to the time wasted and the fact that the documents are not exchanged as freely and as often as they should have been.

SUMMARY OF THE INVENTION

This invention provides an efficient and economical method for exchanging documents during the course of a video conference. A method and means are provided to "piggy Back" a FAX transmission on a video call. Since the FAX takes only a small part of the available band-width, there is very little degradation of the video image.

In band FAX transmission enables a participant at one end of a video conference to share a document with remote participants. Since the FAX travels in-band (sharing available bandwidth) with the video conference, the participants are spared the cost of a second call. Additionally, the document can be sent as a natural part of the discussion, without interruption to the conference. For example, a participant can FAX a document to the remote end, then someone at the remote end can mark it up and return it instantaneously, while the discussion proceeds. In this way, documents can be written, revised, and discussed during the course of the video conference, without additional cost, the frustrating interruptions of leaving the room, or even disrupting the flow of the video conference.

BRIEF DESCRIPTION OF THE DRAWING

Like reference numerals appearing in more than one figure refer to like elements.

DETAILED DESCRIPTION OF THE PREFERRED EMBODIMENT

Figure 2:
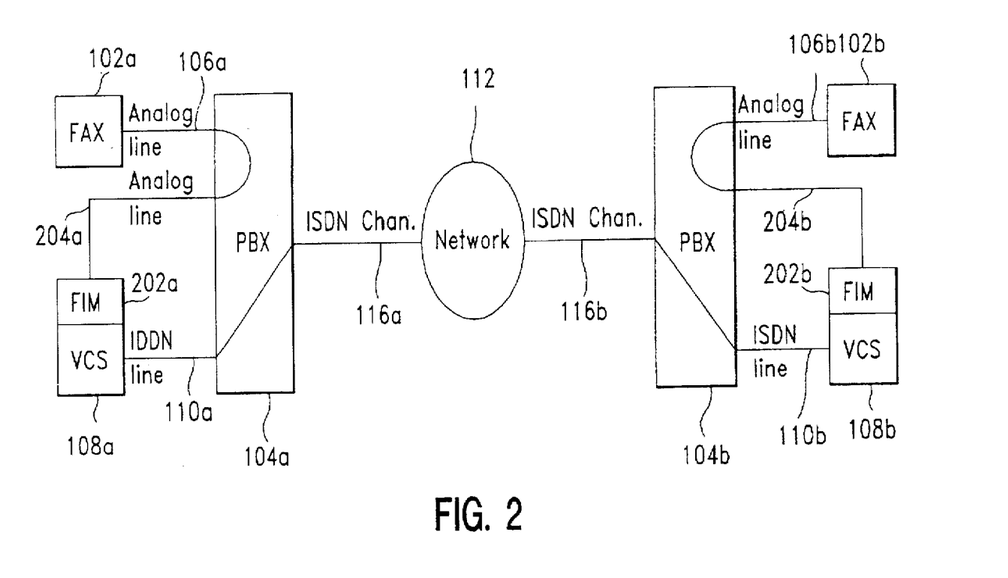
FIG. 2 is a diagram of a video conferencing system embodying the principles of the present invention.

A system embodying the principles of the present invention is shown in FIG. 2. The FAX machines 102a, 102b are connected to the PBXs 104a, 104b in a conventional manner and may be used in the conventional way for all the usual purposes. In addition, however, each VCS 108a, 108b in the system of FIG. 2 includes a respective facsimile interface module (FIM) 202a, 202b. The FIMs provide the system of FIG. 2 with three additional FAX related capabilities: Sending a Document by Video, Printing a Screen Image on the FAX Machine, and Sending a FAX Document to the Video Screen.

Figure 3:
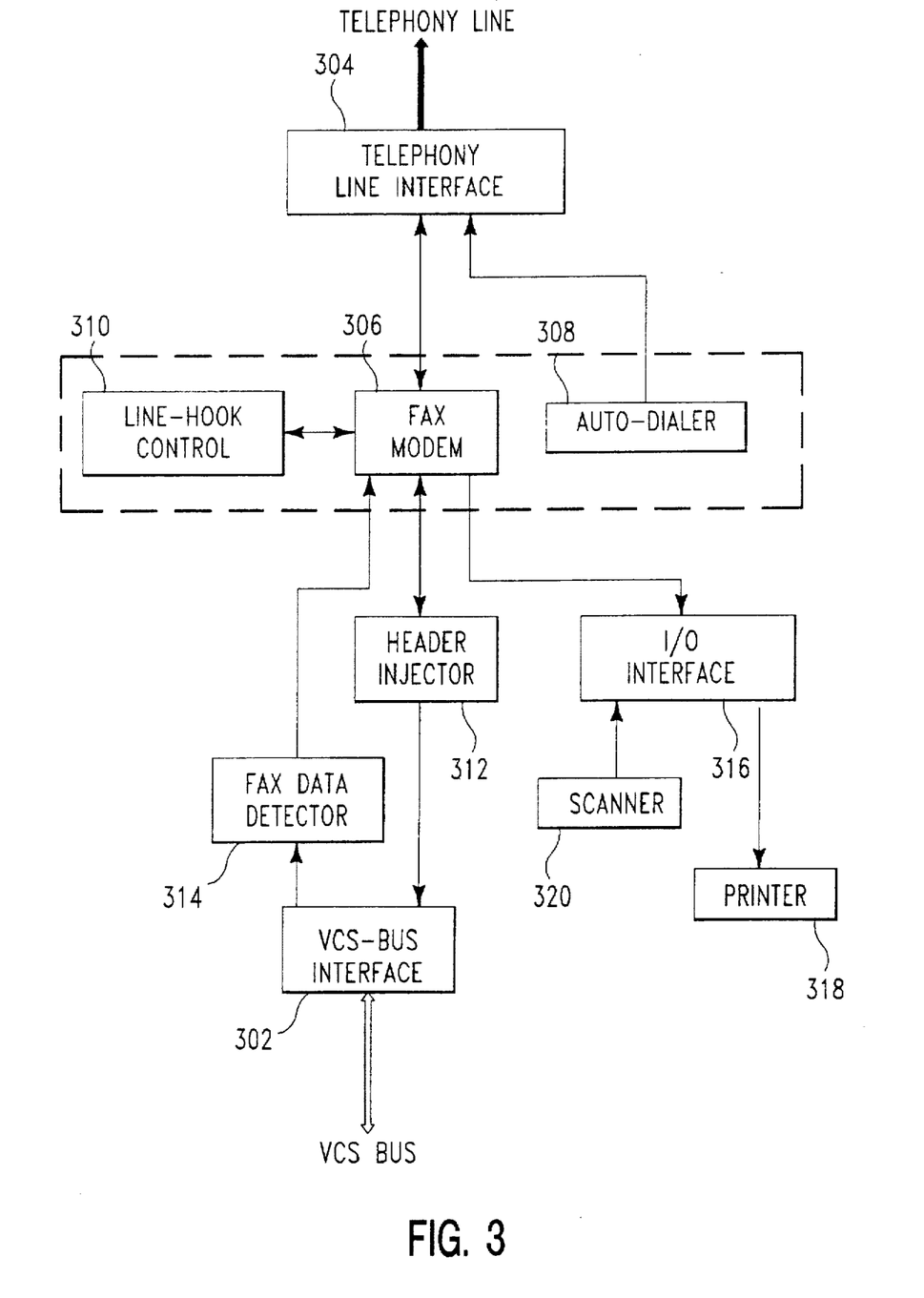
FIG. 3 is a functional block diagram of the FIMs of FIG. 2.

FIG. 3 is a functional block diagram of the FIMs 202a, 202b of FIG. 2. The near end FIM 202a will be described by way of example although it should be understood that both FIMs 202a, 202b are identical. The FIM 202a includes a VCS bus interface 302 which couples the FIM to the data and control lines of the video conferencing system 108a to which it is attached. The FIM 202a also includes a telephony link interface 304 which couples the FIM to the analog telephone line 204a. A fax modem 306 having an autodialer 308 and line hook control logic 310 are connected to the telephony link interface 304. A header injector 312 receives digital FAX data from the FAX modem 306, adds a FAX header, and packetizes the data into a format readable by the VCS. The header injector then sends these packets to the VCS output buffer by way of the VCS bus interface 302. The FIM also includes a FAX data detector 314, which monitors packets received from the VCS by way of the VCS bus interface 302. When the FAX data detector 314 detects a VCS data packet having a FAX header, it strips the header, formats the FAX data for receipt by the FAX modem and sends the data to the FAX modem 306 for modulation on the analog telephone line by way of the telephony line interface 304. The FIM can also include an optional I/O interface 316, which can be used to transfer data between the FAX modem 308 and a printer 318 and scanner 320.

Figure 11:
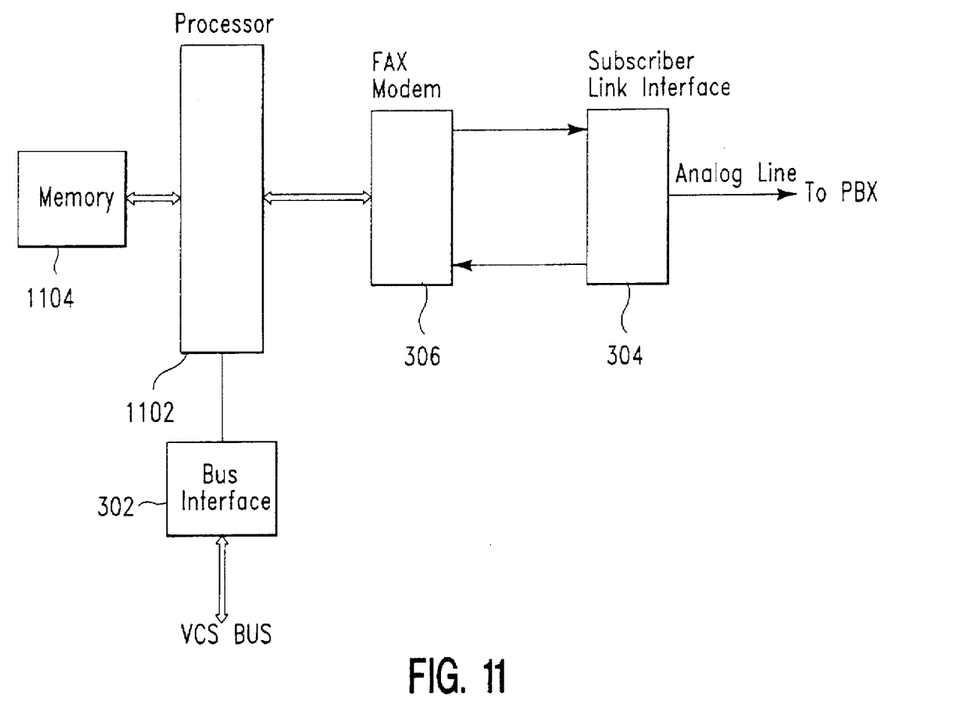
FIG. 11 is a physical block diagram of the FIM of FIG. 2.

As illustrated in FIG. 11, the FIM can be physically embodied using a conventional microprocessor 1102, coupled to a memory 1104 which stores data and programming code to perform the functions of line hook controls 310, auto-dialer 308, header injector 312 and FAX data detector 314 of FIG. 3.

When a video conference is in progress, the FAX transmission can be "piggybacked" on the video call. This is accomplished in the manner illustrated in FIG. 4.

Figure 4:
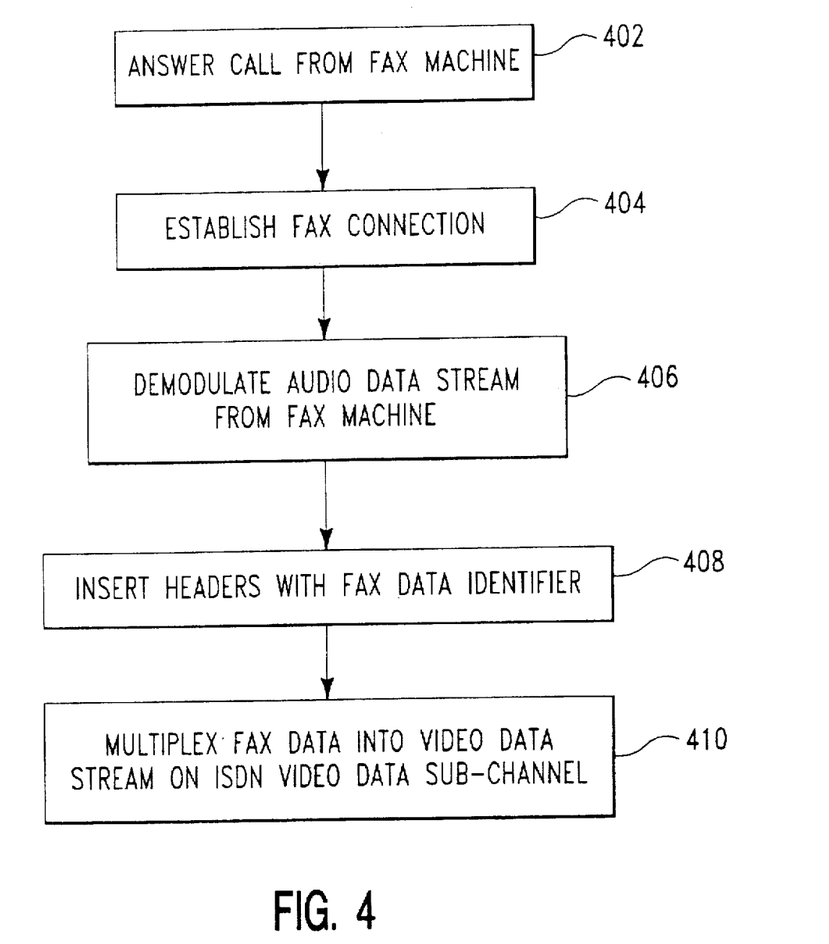
FIG. 4 is a flow chart of the operation of the near end FIM of FIG. 2.

Initially, the party who wishes to send the document places it in their FAX machine 102a and dials the phone extension of a FAX Interface Module (FIM) 202a on their VCS 108a. This can be done by pressing a "stored number" button on the FAX. This number will typically always be the same (perhaps labeled "VIDEO FAX") since the destination of the FAX is implicit in the already established video call. In step 402, the near end FIM 202a automatically answers the call and receives (by way of the analog telephone lines 106a, 204a) the modulated analog audio data stream from the local FAX machine. After answering the call, in step 404, the FIM generates the appropriate conventional handshake and synchronization signals to establish a connection with the local FAX machine. Next, in step 406 the FIM demodulates the modulated audio data stream (sent by the FAX machine 102a) and converts it to a serial digital data stream. In step 408 the FIM 202a adds headers which differentiate the, now digital, FAX data from other data. Finally, in step 410, the FIM multiplexes the FAX data (with headers) into the CCITT H.221 data subchannel of the video conference system.

Figure 5:
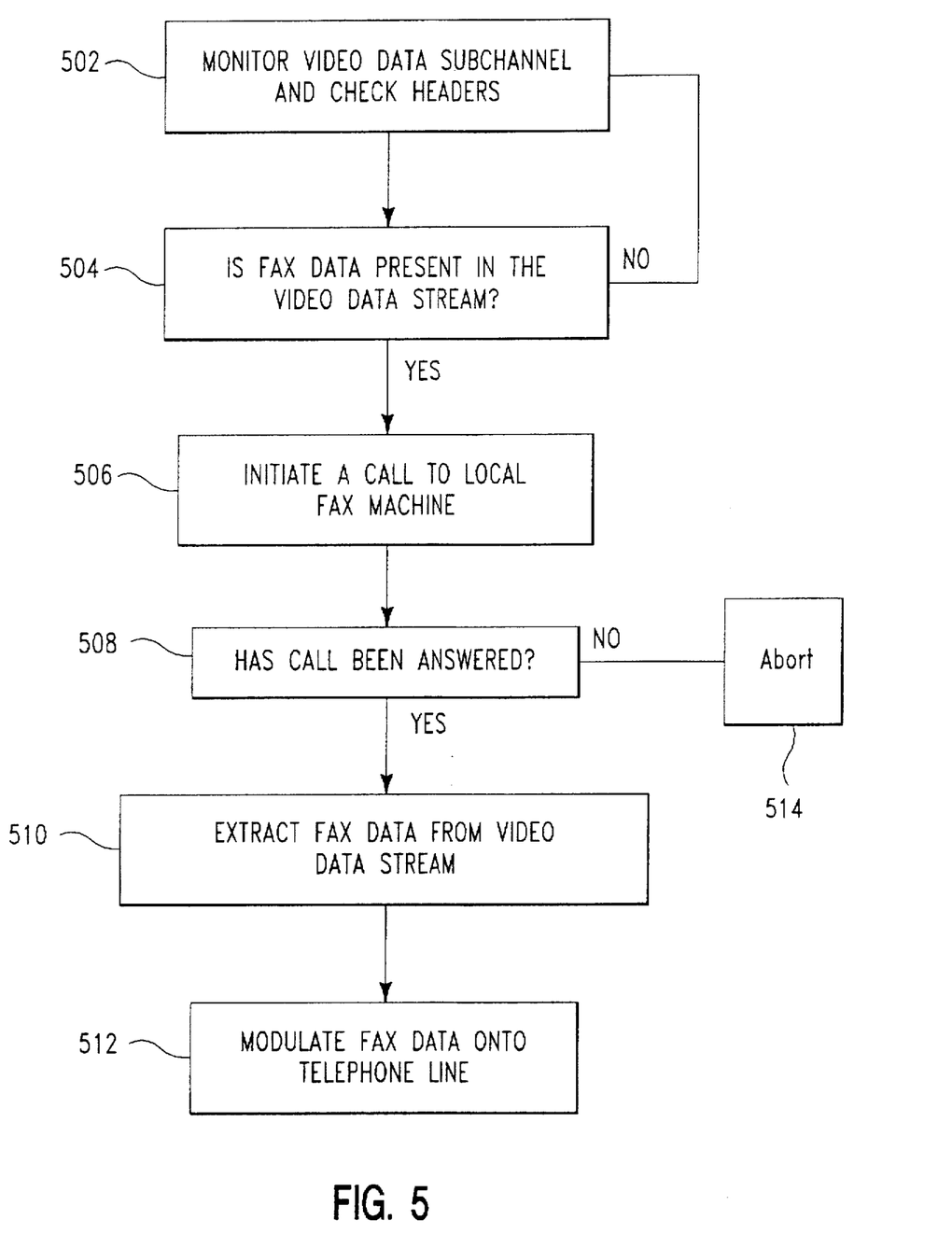
FIG. 5 is a flow chart of the operation of the far end FIM of FIG. 2.

The FAX data flows through the ISDN channels 116a of the near end PBX 104a to the network 112, through the network 112, on through the ISDN channels 116b at the far end PBX 104b, and into the far end VCS 108b. The FIM 202b on the far end VCS 108b then operates as illustrated in FIG. 5.

In step 502, the far end FIM 202b monitors the video data subchannel and compares the packet headers with the known FAX header pattern injected by the near end FIM. The match between a packet header and the known FAX header is detected in step 504. Such a match indicates that the far end FIM has detected FAX data present in the H.221 data subchannel. In response, in step 506, the far end FIM 202b initiates a call to the predetermined number of its associated far end FAX machine. If it is present and operational, the far end FAX machine automatically answers the call. Answering of the call by the FAX machine is detected in step 503. If the call has been answered, in step 510, the far-end FIM extracts the data from the H.221 data stream, and, in step 512 modulates it onto the far-end audio analog line 204b. 106b to the far-end FAX machine 102b. The far-end FAX machine 102b then receives, and prints the document. If, in step 508, the far end FAX machine does not answer the call, in step 514 the FIM aborts the call attempt after a given number of retries.

Since the system is completely symmetrical, either end may send or receive documents.

Figure 6:
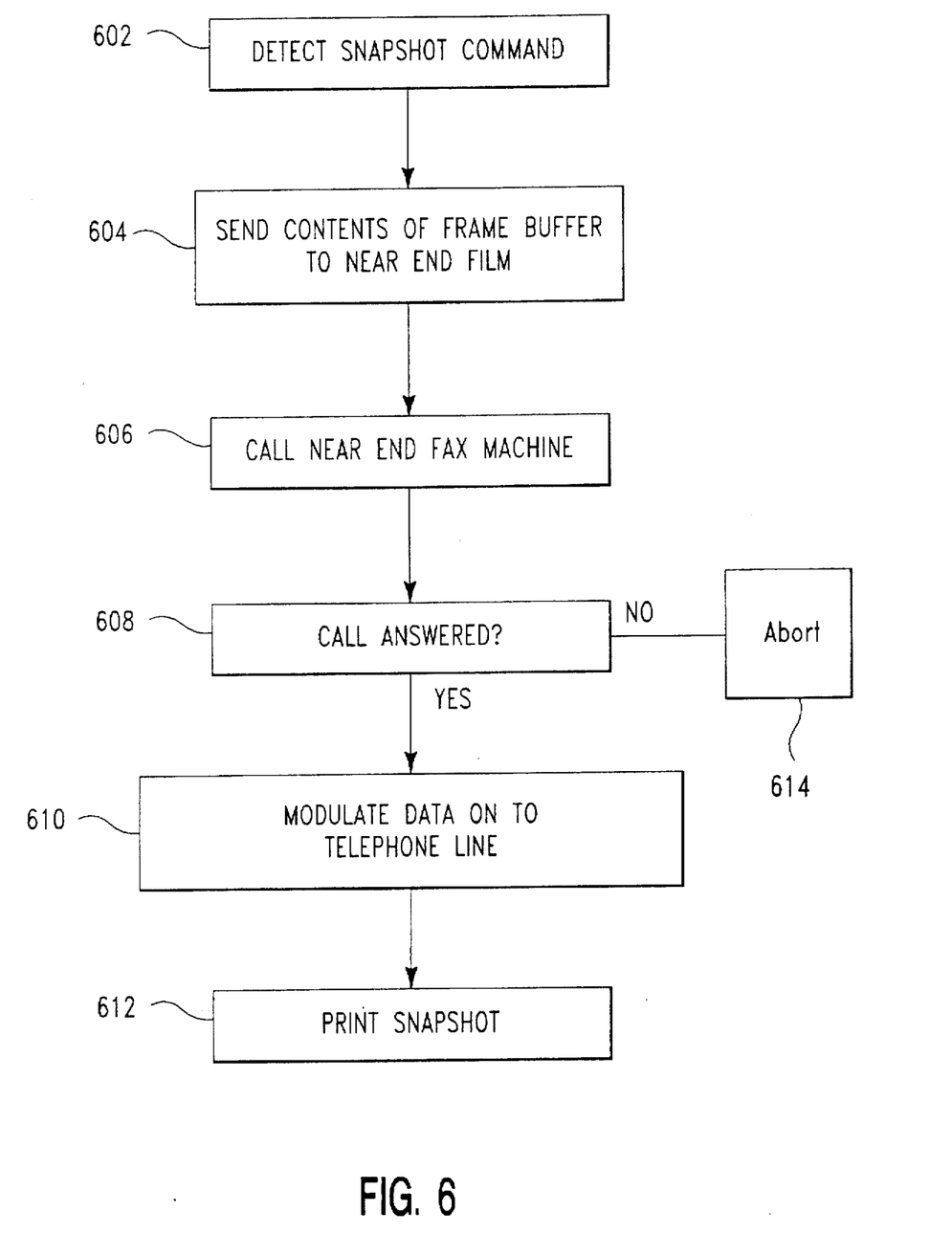
FIG. 6 is; a flow chart of the snapshot operation of the FIMs of FIG. 2.

Another feature of the present system is illustrated in FIG. 6. The near-end VCS 108a includes software which detects a command by the user (e.g. the push of a key or series of keystrokes) to take a "snapshot" of what is currently on the VCS screen. In response to detection of this "snapshot" command in step 602, in step 604 the VCS 108a sends the contents of its frame buffer (screen image memory) to the near-end FIM 202a. Next, in step 606, the near-end FIM 202a automatically establishes a call to the near-end FAX machine 204a. The near-end FAX machine 204a automatically answers the call. After answering of the call has been detected in step 608, in step 610 the near end FIM 202a modulates the data on the analog telephone lines 106a, 204a. In step 612 the near end FAX machine 102a receives the modulated data and prints a document which contains an image of whatever was on the VCS screen at the instant the user pressed the "snapshot" button on the VCS. If, in step 608, the far end FAX machine does not answer the call, in step 614 the FIM aborts the call attempt after a given number of retries.

This is a very useful feature in the case where the far-end is sending pictures of blackboard drawings, images from a document camera and the like. It is also sometimes desirable to simply print a picture of the far-end participants so that meeting attendance may be documented.

It is also desirable to be able to FAX a document to the video screen so 109a and 109b in FIG. 2, that it can be discussed as in a slide presentation. Another case where this is also desirable is when the user wants to work with a document but the far-end does not have a FIM and a FAX. To accomplish this function, the near-end FAX 102a calls the near-end FIM 202a just as in the send document case of FIG. 4, but instead of adding headers and embedding the data in the H.221 data sub-channel, the FIM 202a instead writes the data to the near-end VCS video output frame buffer. The data is then displayed on the far-end VCS 108b even though the far-end may not have a FIM.

This function provides an inexpensive document camera capability. Currently available document cameras are expensive, take up lot of space and are of relatively low resolution. Using a standard FAX machine for this purpose provides very high resolution and in most cases, the FAX machine is already available so it takes up no additional space and costs nothing. The only cost is that associated with adding the FIM to the VCS.

For purposes of clarity and simplicity of exposition, the above description in many cases uses very specific terms. Those of ordinary skill in the art will recognize that many variations on this system can be made. For example the ISDN interfaces can alternatively be T1 or CEPT1 or proprietary. The FAX machine can be instead a personal computer with a FAX card, printer and scanner attached. The PBX need not be present at all, and the public network can provide all the necessary connections. The analog lines to the FIM and/or the FAX machine might alternatively be digital. The H.221 data sub-channel can be another industry standard or a VCS vendor's proprietary implementation of a similar function. The VCS need not be a VCS at all but instead might be some sort of high-end audio conferencing system or even a data conferencing system where personal computers are sharing screen images with each other. Even though all the descriptions refer to a two point (two party) conference, the system is readily extendible to a multi-point (three or more party) configuration.

Two alternate embodiments are as follows: (1) FIM' with dedicated FAX; and (2) Document Interface Module (DIM) —which uses a document scanner and printer instead of a FAX machine. All three of the embodiments may interwork with one another; that is, any of the three can be at one end of the connection, with any of the three at the other end.

Figure 7:
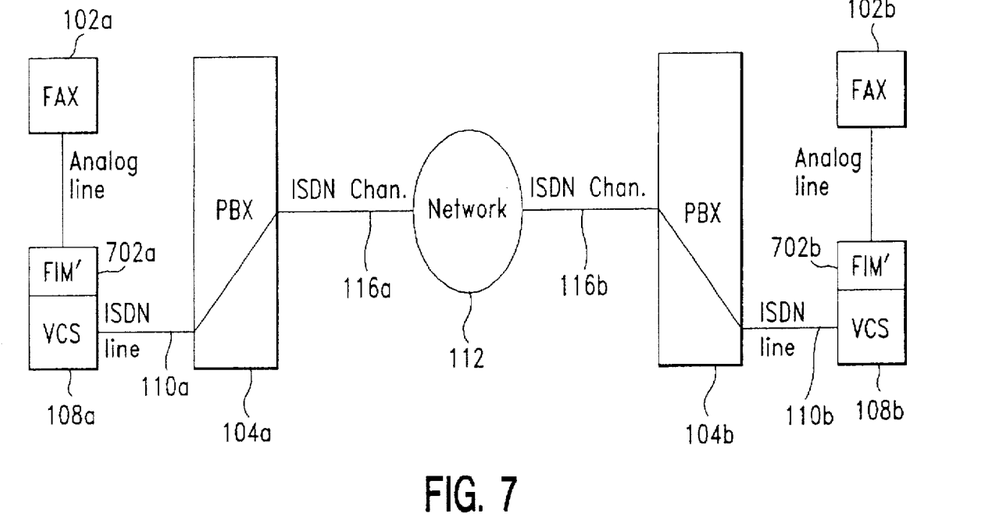
FIG. 7 is a diagram of first alternative embodiment of a system for transmitting facsimile documents during a video conference.

In the FIM' with dedicated FAX embodiment the FAX machine connects directly to a similar, but somewhat different, Fax Interface Module. This will be referred to as FIM' throughout this description. This approach is shown in FIG. 7.

The network topology in this approach is simpler, but there are two significant drawbacks. First, the FAX machine 102a, 102b is dedicated to this application and is not available for normal usage unless the line is manually disconnected from the FIM' 702a702b and connected to the network 112. That is, the user would manually change their set up from FIG. 7 to that shown in FIG. 1 and back, depending on how they were planning to use the FAX machine. This drawback could be minimized through the use of a small manual switch box which would allow the user to switch back and forth more easily.

Figure 8:
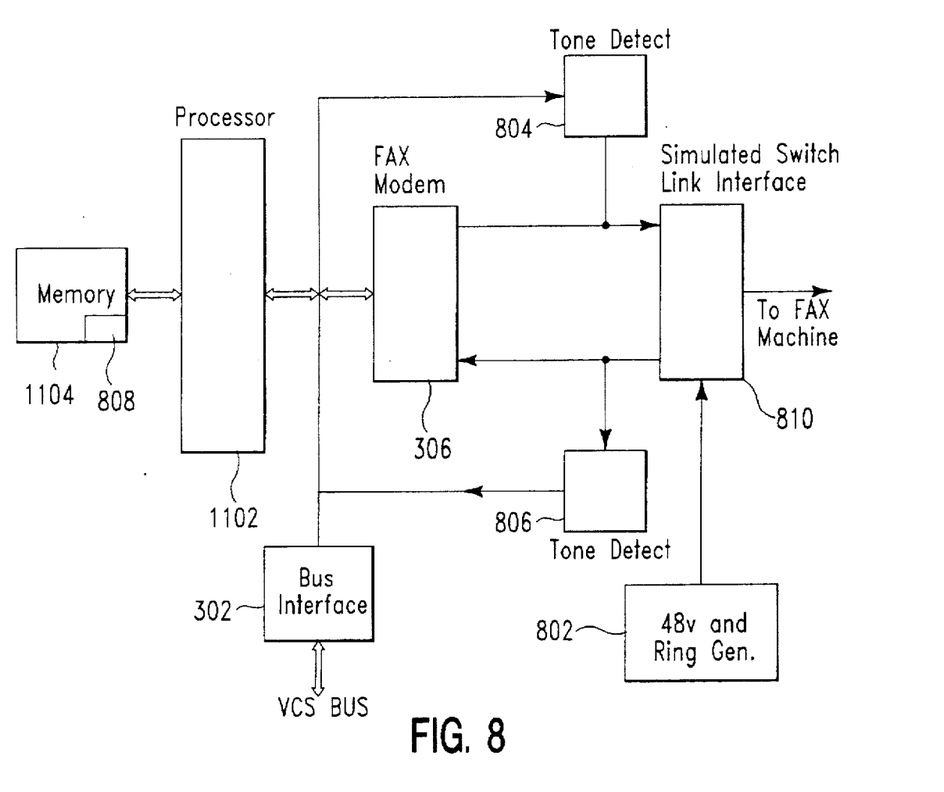
FIG. 8 is a physical block diagram of the FIM' of FIG. 7.

Second, The FIM' card is much more complex and costly than the FIM card. This is because the FIM' provides a "line interface" instead of a "subscriber interface". A physical block diagram of a FIM' card is illustrated in FIG. 8. The FIM' card includes the same type of processor, memory, VCS bus interface and FAX modem as the FIM of FIG. 11. However, as a consequence of providing the line interface, the FIM' also provides the −48 volt talk battery function and ring signal generation circuitry 802, a dial tone generator 804, a DTMF tone detector 806, and call supervision functions 808 as part of the program memory. The FIM also includes a simulated switch link interface 810 which performs the line interface function normally done by the network side of an analog telephone line.

In spite of these drawbacks, this configuration might actually be an attractive one for the user who has no PBX and has to rely on the network for all switching functions. The operation of this embodiment is the same as the embodiment of FIG. 3 with the exception that the call from the FAX machine to the FIM' is hard-wired and the call setup is handled by a processor in the FIM'.

Figure 9:
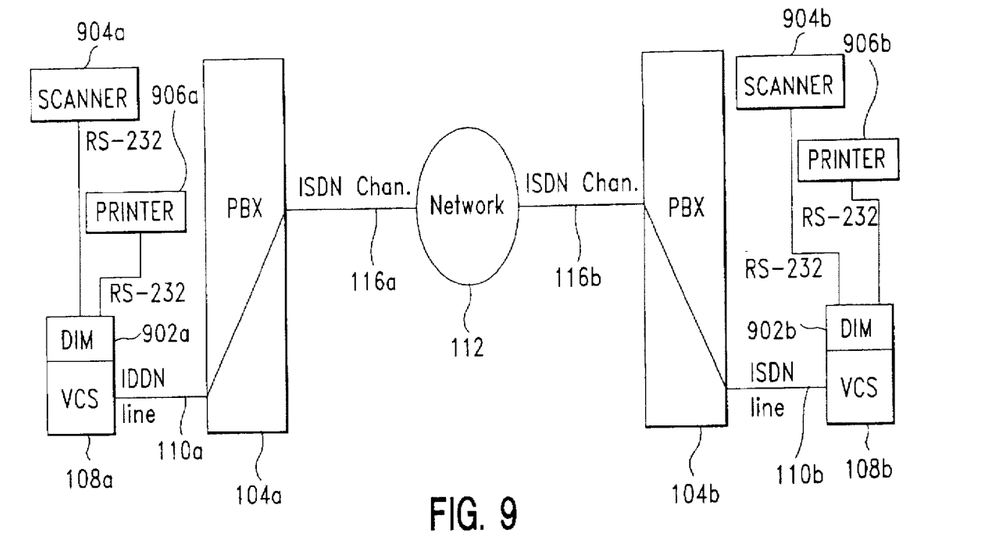
FIG. 9 is a diagram of second alternative embodiment of a system for transmitting facsimile documents during a video conference.

The DIM approach is shown in FIG. 9. In the DIM approach, a document interface module (DIM) 902a, 902b is coupled to the VCS bus in the same manner as the FIM of FIG. 2. A dedicated document scanner 904a, 904b and printer 906a, 906b are coupled to the VCS 108a, 108b by way of the DIM, the document scanner and printer can be connected to the DIM by way of conventional RS-232 serial communication lines. The DIM approach has the drawback of being dedicated to the VCS function, (again possibly alleviated through the judicious use of switch boxes). It does not suffer from the complexities of the FIM' approach, and in fact the DIM is quite simple. This embodiment also has the unique characteristic that documents can be sent in both directions simultaneously. In certain high usage applications where it is not desirable or necessary to share the scanner and printer, or where there is no PBX, this alternative may be the best choice.

Figure 10:
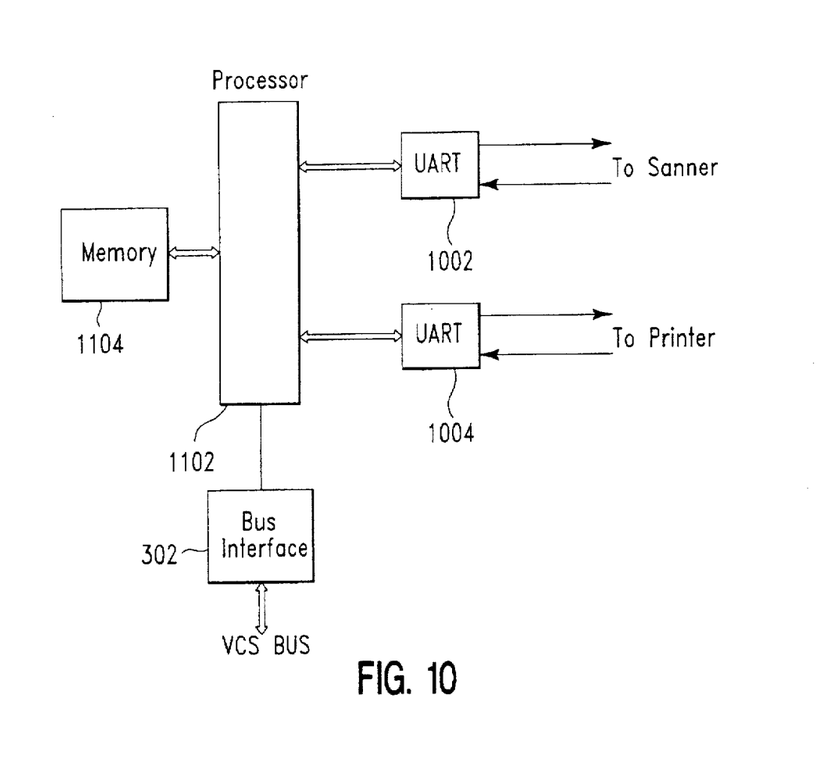
FIG. 10 is a physical block diagram of the DIM of FIG. 9.

A block diagram of the DIM is illustrated in FIG. 10. Like the FIM of FIG. 11, the DIM can be physically embodied using a conventional microprocessor 1102, coupled to a memory 1104 which stores data and programming code to perform the functions of line hook controls 310, header injector 312 and FAX data detector 314 of FIG. 3. However, unlike the FIM of FIG. 11, the DIM includes UARTs 1002, 1004 which directly couple a scanner and printer to the processor 1102. Thus, instead of including an autodialer, the DIM memory 1104 includes program code for servicing the UARTs 1002 and 1004.

The operation of this embodiment is the same as the FIM embodiment of FIG. 2, with the exception that there is no phone call from the document scanner and printer to the DIM since they are hard-wired. When the user puts a document in their FAX machine and presses a single button, the document begins feeding on the near-end and begins printing on the far-end almost immediately. (In fact, if the far-end FAX machine happens to be within the view of the VCS camera, the user will see the document coming out at the far-end even as it is still feeding in at the near-end.) This ease and immediacy gives the user the feeling of being able to actually hand documents back and forth across the communication link.

Now that the invention has been described by way of the preferred embodiment, various enhancements and improvements which do not depart from the scope and spirit of the invention will become apparent to those of skill in the art. Thus it should be understood that the preferred embodiment has been provided by way of example and not by way of limitation. The scope of the invention is defined by the appended claims.

We claim:

1. A method of exchanging facsimile data between a local station and a remote station, with each of said local and remote stations having facsimile capability and video capability, comprising the steps of:

generating modulated facsimile data in response to operation of a first facsimile machine that is located in physical proximity to the local station;

receiving the modulated facsimile data at an interface module coupled to a video conferencing system of the local station, the modulated facsimile data being generated by the first facsimile machine from a document to be imaged;

demodulating the facsimile data so as to form digital facsimile data;

formatting the digital facsimile data into packets, including selecting between formatting the digital facsimile data into facsimile-directed packets for imaging the document via a second facsimile machine at the remote station and formatting the digital facsimile data into video-directed packets for imaging the document via a video conference screen in physical proximity to the second facsimile machine at the remote station;

automatically injecting the packets of digital facsimile data into a digital video stream carrying video conference data bound for the remote station;

receiving a data stream at the local station from the remote station, including receiving video data from the remote station; and selectively converting a portion of the video data received from the remote station into facsimile data and forming a facsimile image of the converted portion of video data at the first facsimile machine.

2. The method of claim 1 comprising the further step of displaying the document on the video conference screen at the remote station in response to video-directed packets that were formatted as video-directed packets at the local station.

3. The method of claim 1 comprising the further step of adding a header to the facsimile-directed packets, indicative that the facsimile-directed packets contain the formatted facsimile data, thereby distinguishing the facsimile-directed packets from the video-directed packets.

4. The method of claim 3 comprising the further steps of receiving the packets at the remote station; remodulating, as analog facsimile data, only the data in the facsimile-directed packets containing the header, stripping the header, and, sending the remodulated data to the second facsimile machine located in proximity to the remote station.

5. An apparatus for handling facsimile capabilities during a video conference involving a local system and a remote system, comprising:

VCS interface means for interfacing with data and control lines of a local video conferencing system having a local video frame buffer;

communication means, connected to said VCS interface means, for transmitting facsimile data to a remote FAX machine and to a remote video frame buffer;

said communication means forming a facsimile copy in response to incoming facsimile data received at the VCS interface means from the remote FAX machine and in response to selected video information received as video data at the local video frame buffer from said remote system;

header injection means, connected to receive outgoing facsimile data from the communication means and to send an outgoing digital video data stream to the VCS interface means, for adding a header to first outgoing facsimile data that is to be transmitted to the remote FAX machine, the header identifying the first outgoing facsimile data as FAX-directed facsimile data, the header thereby distinguishing the first outgoing facsimile data that is transmitted to the remote FAX machine from second outgoing facsimile data that is to be transmitted to the remote video frame buffer of said remote system; and, FAX data detector means, connected to receive an incoming video data stream from the VCS interface means and to send the incoming facsimile data embedded in the incoming video data stream to the communication means, for detecting data having an identifying header in the incoming video data stream, for stripping the identifying header from the data, and for forwarding the data to the communications means;

wherein the FAX directed facsimile data having the header is automatically transmitted over a common data link with a video conference being transacted by way of the video conferencing system.

6. The apparatus of claim 5 wherein the communication means includes an asynchronous transmitter coupled to the remote FAX machine.

7. The apparatus of claim 5 wherein the communication means includes a FAX modem.

8. The apparatus of claim 7 further comprising link interface means, coupled to the FAX modem, for interfacing with a telephony communication line.

9. The method of claim 4, wherein said second facsimile machine is automatically dialed prior to the step of sending said remodulated data.

10. The method of claim 1 wherein the step that includes converting the portion of video data into facsimile data and forming the facsimile image includes substeps of:

storing the contents of a video image from said remote station in a video frame buffer of said local station;

receiving the contents of said video frame buffer at said interface module of said local station; and transmitting modulated facsimile data that is representative of said video image to said first facsimile machine to thereby produce a snapshot of said video image at said first facsimile machine.

11. The method of claim 10, wherein said interface module automatically establishes communications with said first facsimile machine upon receipt of the contents of said video frame buffer.

12. The apparatus of claim 5, wherein said VCS interface means includes means for accepting the contents of the local video frame buffer of said local video conferencing system to thereby create a snapshot of a video image that is sent to the communication means as facsimile data.

13. The apparatus of claim 7, wherein said FAX modem includes an autodialer for automatically establishing communications with said remote FAX machine upon detection of data to be transmitted.

14. The apparatus of claim 5, wherein said communications means further includes a plurality of I/O ports adapted to be coupled to a document scanner and printer.

* * * * *